UNITED STATES PATENT OFFICE.

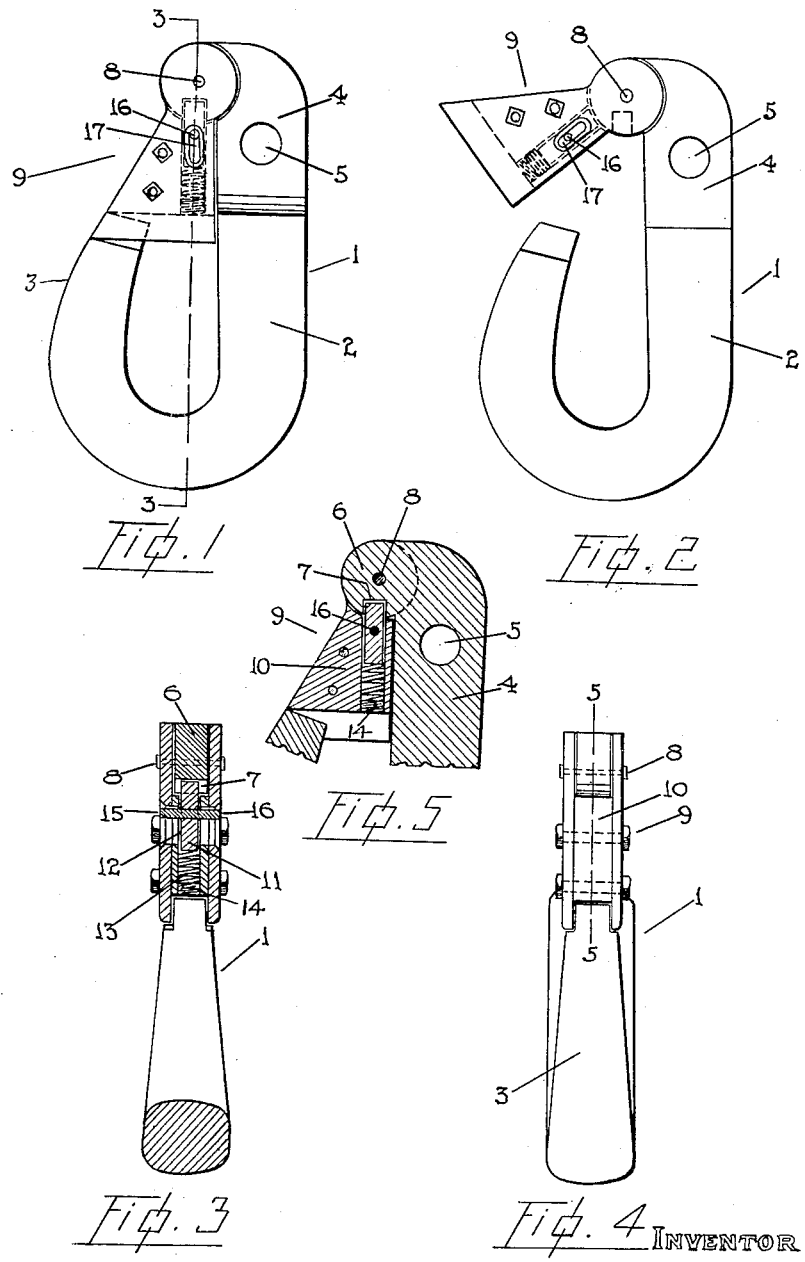

JOHN TORS, OF CAMPBELL RIVER, BRITISH COLUMBIA, CANADA, ASSIGNOR OF ONE-HALF TO ISAAC GUSTAFSON, OF VANCOUVER, BRITISH COLUMBIA, CANADA.

LOGGING-HOOK.

1,371,452.          Specification of Letters Patent.         Patented Mar. 15, 1921.

Application filed August 13, 1920. Serial No. 403,318.

*To all whom it may concern:*

Be it known that I, JOHN TORS, a citizen of the United States, and a resident of Campbell River, in the Province of British Columbia, Canada, have invented certain new and useful Improvements in Logging-Hooks, of which the following is a specification.

My invention relates to improvements in logging hooks, and the object of my invention is to provide a hook adapted for use in logging or other similar work by the use of which the load is securely held to the hauling line, while at the same time connection and disconnection of the load line from the hook is effected with great ease and convenience, the construction of the hook being such that its locking mechanism is protected against brush, dirt, or the like, or blows or jars, during operation.

I attain this object by the construction illustrated in the accompanying drawings in which—

Figure 1 is a side view of the hook closed.

Fig. 2 is a side view of the hook open.

Fig. 3 is a sectional view taken on the line 3—3 of Fig. 1.

Fig. 4 is a front edge view.

Fig. 5 is a fragmentary sectional view showing the hook head.

Similar figures of reference indicate similar parts throughout the several views.

The hook, indicated generally by the numeral 1, is formed as shown in Figs. 1, 2, 3 and 4, having the shank 2 connecting the hook bill 3 with the upper end 4, of the hook which is eyed as at 5 to receive a shackle bolt (not shown). The end 4 is provided with an inwardly projecting boss 6 having a notch 7 formed in its lower periphery; and pivotally connected, as at 8, to this boss is a downwardly extending locking member, indicated generally by the numeral 9, and which consists of a block 10 which is pivoted to the boss 6, a plunger 11 vertically slidable in a bore 12 formed in the block and the end of which engages the notch 7 when the hook is closed, and a spring 13 disposed in the bore 12 between the lower end of the plunger and a screw 14 closing the end of the bore. The plunger 11 is provided with a pin having its ends 15 and 16 extending laterally through vertical slots 17 and 18 formed in the block so that it may be manually operated and if desired plates 19 and 20 may be secured to the opposite sides of the block, which plates extend at their lower ends on opposite sides of the hook bill point so that the point lies between the plates when the hook is closed and thus undue sidewise movement of the locking block is prevented.

The manner in which the hook is operated will be readily apparent as it will be seen that when the hook is closed the end of the plunger 11 is seated in the notch 7 of the boss 6 and is held in spring-pressed engagement therewith by the spring 13 so that the hook cannot become inadvertently open but that when it is desired to open the hook all that is necessary is to grip the ends 15 and 16 and press them downwardly, thus carrying the end of the plunger clear of the notch so that the block may be swung upwardly, as shown in Fig. 2.

From the foregoing it will be seen that I have devised a simple and inexpensive hook which is very easily manufactured and of great utility, and convenience.

What I claim as my invention is:—

1. A logging hook comprising a shank having its lower end curved to form a hook bill and its upper end provided with a projecting boss having a notch in its lower periphery and releasable means normally bridging the space between the shank boss and the tip of the hook bill comprising a pair of slotted plates having the upper ends pivoted to opposite sides of the boss and the lower ends spaced apart to accommodate the tip of the hook bill therebetween, a spacing block secured between said plates and provided with a bore having the walls thereof provided with slots registering with the slots in said plates, a spring-pressed plunger slidable in said bore and engageable in the notch in said boss, and a pin extending through the plunger and the registering slots in the block and plates, the projecting ends of the pin serving to facilitate retraction of the plunger and movement of the closure means relatively to the hook bill.

2. An arrangement according to the preceding claim in which that end of the bore adjacent the free ends of the slotted plates is open and fitted with a removable closure between which and the plunger the spring controlling the latter is confined.

Signed at Campbell River, B. C., Canada, this 3rd day of August, 1920.

JOHN TORS.